Patented May 13, 1924.

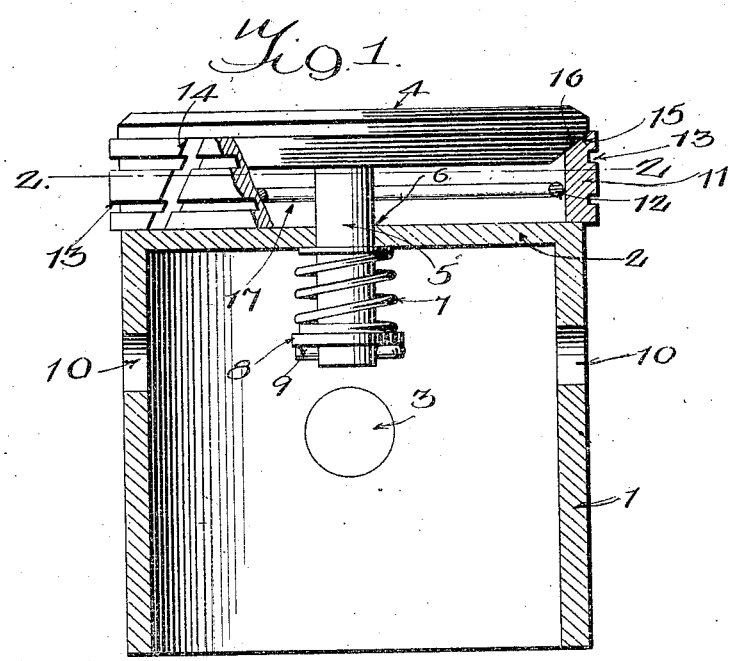
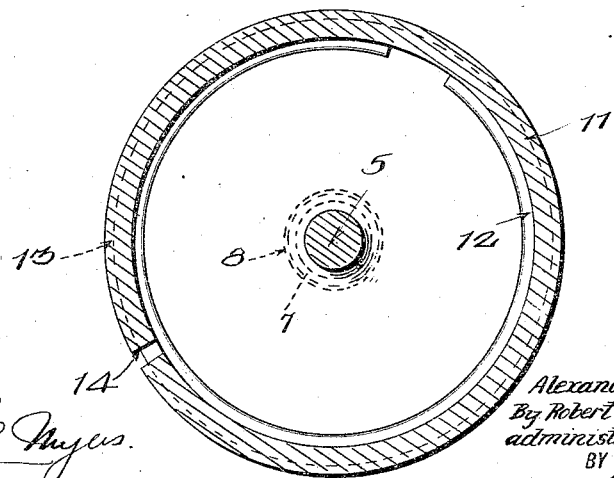

1,494,185

UNITED STATES PATENT OFFICE.

ALEXANDER PHILLIPS, OF TAYLOR, PENNSYLVANIA; ROBERT PHILLIPS ADMINISTRATOR OF THE ESTATE OF SAID ALEXANDER PHILLIPS, DECEASED.

PISTON.

Application filed April 14, 1922. Serial No. 552,588.

*To all whom it may concern:*

Be it known that I, ALEXANDER PHILLIPS, a citizen of the United States, and a resident of Taylor, in the county of Lackawanna and State of Pennsylvania, have made certain new and useful Improvements in Pistons, of which the following is a specification.

My invention relates to improvements in pistons, and it consists in the constructions, combinations and mode of operation herein described and claimed.

An object of the invention is to provide a piston having a ring arranged in such a manner as to be absolutely leak-proof.

A further object of the invention is to provide a piston with a ring which operates in such a manner as to prevent leakage of compression from the explosion chamber and the passage of oil toward the top of the piston, this latter provision obviating deposits of carbon on top of the piston and thereby contributing toward the efficiency of the engine.

A further object of the invention is to provide a piston with an auxiliary head, the piston ring being stationed between the two and actuated upon by spring pressure so as to produce the foregoing functions.

Other objects and advantages will appear in the following specification, reference being had to the accompanying drawing in which:

Figure 1 is a sectional view of a piston (partly in elevation) illustrating the embodiment of the invention, and, Figure 2 is a cross section on the line 2—2 of Figure 1.

In carrying out my invention, I provide a piston 1, which has a head 2 and transversely alined openings 3 for a wrist pin. So far as described, the piston is of ordinary construction, but the piston of the invention includes an auxiliary head 4, which has a central shank 5 adapted to pass through an opening 6 in the piston head 2 so that it may be fitted with a spring 7 for the purpose of pulling the auxilliary head toward the head of the piston 1.

A washer 8 forms the support for the lower end of the spring 7, the other end bearing against the under side of the head 2. A cotter pin 9, inserted through a hole in the end of the stem 5, holds the washer 8 and consequently the spring 7 in place. The cotter pin is inserted through one of a plurality of openings 10 which are bored into the wall of the piston 1 for the purpose.

Situated between the piston head 2 and auxiliary head 4 is a ring 11. In the present instance this ring is made of soft gray iron and the tension which it lacks by reason of being made of this substance is supplied by a spring ring 12 which is fitted on the inside and remains in place by virtue of its tension. The function of this spring ring is to expand the ring 11 against the wall of the cylinder and so maintain a tight contact.

The ring 11 has a plurality of oil grooves 13. The meeting edges 14 of the ring are formed on a bias which may approximately be at an angle of 45 degrees. The meeting ends of the ring may be formed otherwise if desired, for example, the ends may be made to overlap, but since this particular feature is not vital to the invention a detailed illustration of this modification is regarded unnecessary.

It is observed that the upper edge of the ring 11 is beveled inwardly at 15. The auxiliary head 4 is made with a bevel 16 to correspond. Assume that the piston has moved upwardly on a compression stroke, and that the charge is about to be ignited. The explosion of the charge will naturally exert pressure on the auxiliary head 4 so that the ring 11 is expanded radially by virtue of the beveled contacting surfaces 15 and 16.

This radial expansion of the ring against the wall of the cylinder will produce a crank joint so that the possiblity of gas leaking past into the crank case is entirely obviated. It is well known that the formation of carbon on the piston head is caused largely by the presence of oil. The piston ring 11 prevents any oil from passing upwardly and accumulating on top, this being due to the expanding function of the spring ring 12. The spring 7 causes the auxiliary head 4 to press down on the ring 11 and in turn contributes toward maintaining tight joints.

Should it so happen that oil does work upwardly, such oil will find its way into the chamber 17 between the two piston heads where it will collect but pass down through the opening 6 into the crank case and so keep from getting on top of the auxiliary head 4. To this end the chamber 17 is an oil well.

While it is primarily desirable to make the ring 11 of soft material, and depend on such means as the spring ring 12 to expand it radially, nevertheless, the ring 11 may be constructed of spring material so that its inherent resiliency will have the same action as does the spring 12.

Among the advantages attributed to the particular construction shown are the ability to obtain high compression, preventing the formation of carbon on the piston head, and consequently saving oil, avoiding the expense of frequent replacements of piston rings and altogether providing a piston which will last as long as the engine in which it is used.

While the construction and arrangement of the improved piston as herein described and claimed is that of a generally preferred form, obvious modifications and changes may be made without departing from the spirit of the invention or the scope of the claims.

I claim:—

1. A piston having a head, a ring of soft material stationed on the head at the periphery, said ring having an inwardly beveled edge; an auxiliary head fitted on the ring with a corresponding bevel in contact with said beveled edge, a spring ring contacting the piston ring to expand it radially, a shank on the auxiliary head passing through an opening in the piston head, a spring on said shank bearing between a washer on the shank and the piston head to keep the auxiliary head in contact, said head serving to further expand the piston ring by virtue of said beveled surfaces when pressure is imposed thereon, and a cotter pin inserted into the shank beneath the washer through a suitable opening in the piston to hold the washer and spring in place.

2. A piston having a flat head making square angles with the sides, an auxiliary piston head spaced from the flat piston head and being peripherally beveled at the adjoining corner, a split ring situated between the heads having a bevel at the upper edge to fit said peripheral bevel and being square on the bottom to snugly seat on the flat piston head, said ring having circumferential oil grooves, a spring in the space between the piston heads tending to spring the ring apart, a shank carried by the auxiliary head and passing through the flat head, spring supporting means carried by said shank, and a spring disposed between said supporting means and the underside of the flat head.

3. A piston having an opening in the head and openings in the sides, an auxiliary piston head situated above said piston, a shank on the auxiliary head extending through said head opening, a piston ring fitted between said heads, a spring on the shank beneath the piston to hold the auxiliary piston down on the ring, and means on the shank adapted to hold the spring in place being situated substantially in the plane of said side openings to permit removal of said spring holding means therethrough.

4. A piston having an opening in the head and openings in the sides, an auxiliary piston head situated above said piston, a shank on the auxiliary head extending through said head opening, a piston ring fitted between said head, a spring on the shank beneath the piston to hold the auxiliary piston down on the ring, and a cotter pin fitted through the shank to furnish a support for the spring said cotter pin being situated substantially in the plane of said side openings to permit removal of the pin therethrough.

5. The combination of a piston having a flat head, an auxiliary piston head situated above the flat head, a split ring situated between said heads having a beveled end to meet a corresponding bevel on the auxiliary head and a square end to rest on the flat head, means by which the auxiliary head is held down on the ring and the ring is caused to slide radially over said flat head by virtue of being spread, and a spring contacting the inside of the ring supplementing the spreading function of said means.

ALEXANDER PHILLIPS.